Patented Oct. 25, 1932

1,885,025

UNITED STATES PATENT OFFICE

GORDON D. PATTERSON, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION

No Drawing.     Application filed February 24, 1930. Serial No. 431,043.

This invention relates to the art of coating compositions, and more particularly to coating compositions that are substantially free from cellulose derivatives and yet are resistant to outside atmospheric influences.

I have discovered that, by using polyhydric alcohol-polybasic acid resins of certain types indicated hereinafter, as the vehicle, it is possible to produce a wide range of pigmented coating compositions for outside use that possess many advantages which it has not been possible to obtain with paints using drying oil or varnish type vehicles.

I have also discovered that by the use of resins of this type it is possible to utilize, in coating compositions which are resistant to outside atmospheric influences, pigments and pigment combinations which are not satisfactory when used with drying oil or varnish type vehicles.

It is therefore an object of this invention to produce new and useful pigmented coating compositions.

It is another object of this invention to produce pigmented coating compositions which have better resistance to chalking, checking and cracking, as well as a more rapid drying rate.

It is a further object of this invention to produce durable coating compositions which may be made up with single pigments.

It is a still further object of this invention to produce durable coating compositions which will form films that have higher percentages of pigments than has heretofore been possible, in order to obtain high hiding power with fewer coats.

It is a special object of this invention to produce coating compositions that are especially resistant to outside atmospheric influences.

It is a further special object of this invention to produce durable coating compositions for outside use which contain antimony pigment as the principal pigment.

It is an additional object of this invention to produce coating compositions which will have unusual retention of gloss during outside exposure.

With the above and other objects in view, which will be apparent as the description proceeds, I have set forth my invention in the following specification and have included the following examples of paint and enamel compositions embodying my invention by way of illustration and not as a limitation:

*Example 1.—Single pigment white enamel*

|   | Parts by weight |
|---|---|
| Antimony oxide pigment | 208.0 |
| Resin A (Acid No. 1.2) | 100.0 |
| Cobalt linoleate | 0.4 |
| Manganese linoleate | 0.4 |
| Mineral thinner | 65.0 |
| Total | 373.8 |

Resin A used in the above composition was formed from the following ingredients using the proportions indicated:

|   | Parts by weight |
|---|---|
| Glycerol | 17.11 |
| Linseed oil acids | 55.80 |
| Phthalic anhydride | 27.09 |
| Total | 100.00 |

*Example 2.—Mixed pigment white paint*

|   | Parts by weight |
|---|---|
| Antimony oxide pigment | 122.0 |
| Lithopone | 63.0 |
| Resin A (Acid No. 1.2) | 100.0 |
| Cobalt linoleate | 0.4 |
| Manganese linoleate | 0.4 |
| Mineral thinner | 93.0 |
| Total | 378.8 |

*Example 3.—Mixed pigment white paint*

|   | Parts by weight |
|---|---|
| Antimony oxide pigment | 135.0 |
| Zinc oxide (5% leaded) | 71.0 |
| Resin A (Acid No. 1.2) | 100.0 |
| Cobalt linoleate | 0.4 |
| Manganese linoleate | 0.4 |
| Mineral thinner | 105.0 |
| Total | 411.8 |

*Example 4.—Mixed pigment white paint*

| | Parts by weight |
|---|---|
| Antimony oxide pigment | 128.0 |
| Basic carbonate white lead | 65.0 |
| Resin B (Acid No. 2.5) | 100.0 |
| Cobalt linoleate | 0.4 |
| Manganese linoleate | 0.4 |
| Mineral thinner | 99.0 |
| Total | 391.8 |

Resin B used in the above composition was formed from the following ingredients using the proportions indicated:

| | Parts by weight |
|---|---|
| Glycerol | 13.43 |
| Linseed oil acids | 72.06 |
| Phthalic anhydride | 14.51 |
| Total | 100.00 |

*Example 5.—Gray paint*

| | Parts by weight |
|---|---|
| Antimony oxide pigment | 206.0 |
| Carbon black | 2.0 |
| Resin D (Acid No. 5.2) | 100.0 |
| Cobalt linoleate | 0.4 |
| Manganese linoleate | 0.4 |
| Mineral thinner | 65.0 |
| Total | 373.8 |

Resin D used in the above composition was formed from the following ingredients using the proportions indicated:

| | Parts by weight |
|---|---|
| Glycerol | 11.87 |
| Linseed oil | 60.10 |
| Phthalic anhydride | 28.03 |
| Total | 100.00 |

*Example 6.—Mixed pigment white paint*

| | Parts by weight |
|---|---|
| Antimony oxide pigment | 111.0 |
| Barium base titanium pigment | 62.0 |
| Resin F (Acid No. 2.7) | 100.0 |
| Cobalt linoleate | 0.4 |
| Manganese linoleate | 0.4 |
| Mineral thinner | 93.0 |
| Total | 366.8 |

Resin F used in the above composition was formed from the following ingredients using the proportions indicated:

| | Parts by weight |
|---|---|
| Glycerol | 16.30 |
| Phthalic anhydride | 27.24 |
| Linseed oil acids | 47.10 |
| China wood oil | 9.36 |
| Total | 100.00 |

*Example 7.—Mixed pigment white paint*

| | Parts by weight |
|---|---|
| Antimony oxide pigment | 62.0 |
| Barium base titanium pigment | 111.0 |
| Resin J (Acid No. 30) | 100.0 |
| Cobalt linoleate | 0.4 |
| Manganese linoleate | 0.4 |
| Mineral thinner | 35.0 |
| Solvent naphtha | 60.0 |
| Total | 368.8 |

Resin J used in the above composition was formed from the following ingredients using the proportions indicated:

| | Parts by weight |
|---|---|
| Glycerol | 21.71 |
| Phthalic anhydride | 42.83 |
| Linseed oil acids | 35.46 |
| Total | 100.00 |

The coating compositions set forth above, as well as other coating compositions falling within the scope of the present invention, are prepared by grinding or dispersing the pigment or pigment combination with the resin in the presence of sufficient solvent and diluent to provide a consistency suited to the dispersing device used. After dispersion the paint is reduced to application consistency with additional solvent or diluent. The drier may be added at any desired point in the preparation of the coating composition.

Where desired, extenders or fillers, such as blanc fixe, barytes, silica, asbestine, whiting, talc and china clay, may be incorporated in the coating compositions falling within the scope of the present invention.

The polyhydric alcohol-polybasic acid resins referred to above may be made in any well known manner as, for example, by heating the ingredients at any suitable temperature above the melting point of the materials until resinification is complete. In the preparation of resins of unusually light color, it has been found preferable to carry out the reaction in the presence of an inert gas. If desired, refluxing or partial refluxing may be resorted to or the operation may be carried out at elevated or reduced pressures. Where oil is used in place of oil acids, it is desirable, in order to obtain a homogeneous product, to heat the oil and glycerol together before adding the phthalic anhydride. Other modifying ingredients, if used, may be added in either stage.

In general it is advisable to maintain the acid number of the resin at the lowest possible value, and this is usually accomplished by increasing the temperature or the period of heating, but stopping before the gel point is reached. In certain cases in which an extremely low acid number is unnecessary, the heating is stopped when a low enough acid number is obtained, in order to avoid unduly increasing the viscosity of the resin. The allowable range of acid numbers will vary with the type of polyhydric alcohol-polybasic acid resin used and also with the type and quantity of pigment. With chemically active pigments, like antimony, zinc oxide or basic carbonate white lead, the acid number should preferably be below 20. With chemically inert pigments, like barium base titanium pigments, the question of acid number is not as important as in the case of chemically active pigments. In general, I prefer to maintain the acid number below 30 for resins having a combined oil acids content of 35% or more. Below this oil acids content the acid number should preferably be at the lowest value at which it is possible to prepare the resin. In any case the acid number must be low enough to avoid instability of the liquid composition as evidenced by livering or gelling induced by chemically reactive pigments.

By the term "modified polyhydric alcohol-polybasic acid resin", as used herein, I mean the resinous condensation product resulting from the reaction of one or more polyhydric alcohols and one or more polybasic acids with one or more of the following modifying ingredients: Drying oils, semi-drying oils, synthetic drying oils, and monobasic acids, especially those derived from drying oils and semi-drying oils, synthetic drying oil acids, and mixtures of one or more of these modifying ingredients with natural resins, as well as equivalent resinous condensation products, such as those resulting from the reaction of polybasic acids and partially acylated polyhydric alcohols where the acylating material is one or more of the acidic modifying ingredients referred to above.

By the term "modifying agent", as used herein, I mean an ingredient of the type mentioned in the definition of "modified polyhydric alcohol-polybasic acid resin" in the preceding paragraph, other than a polyhydric alcohol or a polybasic acid.

By the term "oil modified", as used herein, I mean that the product referred to is chemically modified by one or more drying oils, semi-drying oils, synthetic drying oils, drying oil acids, semi-drying oil acids, and/or synthetic drying oil acids.

As indicated by the above examples it will be apparent that my invention is applicable in connection with a wide range of oil modified polyhydric alcohol-polybasic acid resins, and my work has indicated that the modifying ingredients may vary over a wide range, although I prefer that they be used in amounts equal to from approximately 22 to 82% of the total composition where the modifying agent is linseed oil acids, and over slightly narrower ranges where the linseed oil acids are replaced, in whole or in part, by other drying oil acids or by drying oils, or by mixtures of drying oil acids and either semi-drying oils or natural resins. Where linseed oil acids are replaced by other modifying agents, as indicated above, I have found it desirable to make these replacements on a molecular weight basis in order to obtain substantially equivalent results, although substitutions which are not made strictly on a molecular weight basis may be resorted to without sacrificing many of the desirable advantages of my invention.

Since straight polyhydric alcohol-polybasic acid resins contain no glycerides of oil acids, and oil type vehicles are largely glycerides of oil acids, it will be apparent that the major improvements which it is the purpose of this invention to accomplish are attained where a substantial amount of oil acids, or their equivalent, is introduced into the resins used. However, where the amount of oil acids is very high, so that only a small amount of phthalic anhydride is included, the improvement in durability over oil type compositions is slight, but the improvement becomes more noticeable as the quantity of phthalic anhyhride is increased, provided a substantial amount of oil acids or their equivalent is present.

Resins high in combined oil acids content can be used successfully over any type of surface to which oil or varnish paints can be applied. However, resins of lower combined oil acids content are less well adapted than those of higher combined oil acids content for use on surfaces which are subjected to severe expansion or contraction, such as occurs in soft woods like white pine under the influence of moisture. The lower oil length resins, however, are admirably suited for use over surfaces such as metal and have been successfully applied directly to steel without a preliminary system of undercoat films such as are ordinarily required. Resins low in combined oil acids content, which produce pigmented films having the same drying time as short oil varnishes, develop markedly superior durability in comparison with the latter type products.

For use over wood I prefer, but do not restrict myself to, the range of 35% to 72% combined oil acids, expressed as linseed oil acids. For use over steel, or other metal, even lower oil acids contents can be used successfully, including compositions as low as 22% in oil acids. Where the combined oil acids content of the resin is as low as from 22% to 35%, expressed as linseed oil acids, however, the pigment combination should not contain more than 5% of chemically active pigments, such as antimony, zinc oxide or basic carbonate white lead. Furthermore, even in the range of from 35% to 45% combined oil acids, expressed as linseed oil acids, I find it is desirable to use a preponderance of chemically inert pigments as the film is sufficiently hard, and excessive hardness developed by chemically active pigments may cause too high a degree of brittleness.

In selecting resins for specific purpose paints, the principles pointed out above should be kept in mind.

The antimony oxide used in the above examples was the commercial pigment which consists essentially of antimony tri-oxide, $Sb_2O_3$. It has an oil absorption of 107 compared with lithopone as 100 and a hiding power in the same range as commercial barium base titanium pigment.

Although the above examples have been limited to modified glyceryl phthalate resins I desire to have it understood that other polyhydric alcohol-polybasic acid resins having the general properties of those indicated may be substituted therefor.

Similarly, although the above examples stress the use of single pigment combinations, and are limited to the use of white and black pigments, it will be obvious that any other desired colors, as well as various combinations of white pigments, may be used with advantageous results. It is an important advantage of compositions of the type set forth herein that when they include colored pigments but do not include any titanium oxide pigment the resulting films are unusually resistant to the fading which is characteristic of paints and enamels using drying oil or varnish type vehicles. Where titanium oxide pigments are used it is ordinarily preferable not to include colored pigments inasmuch as the more rapid chalking of titanium oxide pigments tends to cause fading and spoil the general appearance when this pigment is combined with colored pigments. However, where titanium oxide pigments are used in colored coating compositions containing substantial quantities of antimony oxide, the resulting films are remarkably resistant to fading caused by chalking. The use of substantial amounts of titanium oxide pigments in colored coating compositions is thus rendered possible when substantial quantities of antimony oxide pigment are included in the pigment combination.

Although the driers used in the above examples have been calculated on the basis of .05% of the particular metal based on the drying oil content of the resin, it will be obvious that other percentages may be used and that other driers may be substituted for those indicated.

I have found it desirable, in order to improve the brushing viscosity, to utilize solvents having relatively high boiling points, preferably above 140° C. Although solvent mixtures containing a large proportion of mineral thinner and solvent mixtures containing both mineral thinner and aromatic solvents have been stressed as the solvents in the above examples, because these represent preferred solvent mixtures, other solvents, such as petroleum distillates of high boiling point, especially with the addition of high boiling point organic solvents, may be used.

For resins as high in combined oil acids content as 56%, aliphatic solvents, such as mineral thinner, may ordinarily be used. However, as this value is reduced, the partial substitution of aromatic solvents, such as xylol or solvent naphtha, is usually desirable in order to maintain the resins in solution and at low viscosity. In cases where brushing and flowing properties are important, the ease and time of brushing can be increased by incorporating high boiling solvents which prevent the early development of high viscosity in the film.

Inasmuch as polyhydric alcohol-polybasic acid resins prepared by different methods have different viscosities, I desire to have it understood that the proportion of solvent indicated in the above examples may be varied over relatively wide limits, depending on the particular resin used, its method of preparation, the pigment characteristics, and the method of applying the coating composition.

Heretofore the use of titanium oxide pigments in coating compositions for exposure to the weather has been limited because of the abnormal tendency of such pigments to chalk. This is so severe that oil films containing substantial amounts of titanium oxide pigments become thin and cease to hide or protect the under surface long before the average oil paint loses its protecting value. If a titanium oxide pigment is used alone in the usual linseed oil vehicle, such as is commonly used in high grade outside paints, the film is almost completely chalked away after three to six months' exposure, depending upon the severity of weathering and the thickness of the film. Thus, while basic carbonate white lead has been used for many years as a single pigment in oil paints, it was soon recognized that titanium oxide pigments could not be used in this way. Incorporation of zinc oxide with the titanium oxide pigment in linseed oil paints reduces the tendency of the film to chalk, but even the optimum proportions of these pigments are less durable in oil paint vehicles than the average outside paint, due to chalking of the film. The balancing of a formula containing zinc oxide and titanium oxide pigments is difficult, for insufficient zinc oxide leads to early chalking failure and an excess of this pigment causes the film to fail by cracking. Even at the optimum balance between severe chalking and the tendency to crack, an oil paint will ordinarily fail within one to one and one-half years on severely exposed surfaces, such as porch railings or window sills. Similarly pigmented coating compositions containing resin A do not fail in three years' exposure under the same conditions.

The excessive chalking characteristic of titanium oxide pigments with outside paint vehicles is reduced markedly when certain polyhydric alcohol-polybasic acid type resins are used as the binding vehicle. In this way extremely durable coating compositions having unusually desirable properties can be prepared from titanium oxide pigments either alone or in combination with other pigments. Moreover, polyhydric alcohol-polybasic acid resin films containing major quantities of titanium oxide pigments are not subject to the checking and cracking failure characteristic of ordinary paint films. This is a remarkable property of the resin paints which I have developed for it insures a satisfactory surface for repainting. In addition, these paints, when formulated with a very high proportion of titanium oxide pigment, combine unusual durability with slow, continuous and uniform chalking at a rate just sufficient to keep the surface of the paint free from deposited dirt particles. Thus the initial excellent whiteness and cleanliness of the film is maintained permanently. Furthermore, such chalking as does take place is uniformly distributed over the entire surface, thus avoiding unsightly inequalities in the coating.

I have found that when antimony is present in a pigment combination containing titanium the resistance to chalking is increased materially, and that antimony oxide pigments are definitely superior to the common white pigments in this respect. For instance, if the composition set forth in Example 7 is prepared by substituting an equal amount of resin A for resin J the resulting mixed pigment white paint will be free from appreciable chalking for a period of approximately 9 months' severe exposure (when the initial exposure includes the summer months), whereas in a similarly prepared paint in which an equal amount of zinc oxide pigment replaces the antimony oxide pigment, chalking starts within 3 months and the film chalks noticeably, but without materially damaging its durability, during the period from 4 to 9 months when exposed under the same conditions.

It is another important advantage of compositions of the type set forth herein that they are markedly resistant to checking and cracking failures.

Coating compositions for exterior use, particularly whites, are frequently lacking in the power to hide the underlying surface when only one or possibly two coats are applied. An obvious means for improving hiding power lies in increasing the pigment content of the film but this has not been possible in oil type compositions because of the harmful effect upon durability (increased chalking or checking and cracking). By the use of resins of the type disclosed herein, however, it is possible to bind larger quantities of pigments than normally can be used in paints, thus permitting the development of films having unusually high hiding power, and the use of a lesser number of coats, or coats having a lesser thickness, to secure satisfactory hiding without sacrifice in the ultimate durability of the films.

Compositions containing major quantities of antimony oxide (that is, quantities greater than 50% of the pigment combination) are characterized by unusual retention of gloss during exposure, being superior to all of the common white pigments in this respect. As disclosed and claimed in one of my co-pending applications, filed of even date herewith, however, zinc oxide containing pigments which contain more than 8% of lead compounds, calculated as lead sulfate, also possess this property. This retention of gloss increases as the percentage of antimony oxide is increased. Where a titanium pigment is used in conjunction with antimony oxide the proportion of the latter must be increased to get the same degree of gloss retention as when titanium is not present. For instance, the composition set forth in Example 1 retains a definite degree of gloss during 6 months' severe exposure (when the initial exposure includes the summer months), whereas a similarly prepared single pigment white enamel in which an equal amount of zinc oxide pigment or basic carbonate white lead is substituted for the antimony oxide pigment of Example 1 will have lost substantially all of its gloss after 1 to 2 months' exposure under the same conditions. On the other hand, where a composition of the type set forth in Example 1 is prepared using a typical linseed oil vehicle in place of the vehicle of Example 1 extreme chalking results within the first month of exposure under severe summer conditions.

My improved compositions also form films which are more stable to sunlight and atmospheric influences than previous coating compositions.

I have also found that with coating compositions of the type set forth herein the surface drying takes place at a sufficiently rapid rate to keep the paint clean during the early stages of drying, thus avoiding the collection of dirt and flies, which is especially desirable under certain conditions of application and at certain seasons of the year. Moreover, films of these paints are not injured by exposure to rain shortly after application, whereas ordinary oil paint films of the same age are spotted or washed away under the same circumstances. This is frequently an important factor in successful exterior painting.

It will therefore be apparent that I have developed a new and useful group of coating compositions that are substantially free from cellulose derivatives which have more rapid drying rates, better resistance to chalking, checking, and cracking, better gloss retention, and greater hiding power with fewer coats than compositions heretofore obtainable, and that the colors of the resulting films are more stable.

These coating compositions are valuable in a wide range of commercial applications, such as house paints, freight car paints and paints for general railway use, sign enamels and paints, and metal protective and decorative paints in general.

By the terms "antimony" or "antimony pigment", as used herein, I mean a pigment containing chemical compounds of antimony (for example, antimony oxide or basic compounds of antimony), either alone or in conjunction with other modifying or extending ingredients.

By the terms "titanium" or "titanium pigment", as used herein, I mean a pigment containing chemical compounds of titanium (for example, titanium oxide), either alone or in conjunction with other modifying or extending ingredients.

By the term "barium base titanium pigment", as used herein, I mean a pigment containing barium sulfate and titanium oxide intimately blended or associated in the process of pigment manufacture, the particular composition referred to herein containing 75% of barium sulfate and 25% of titanium oxide.

By the term "zinc pigments", as used herein, I mean zinc oxide and zinc sulfide pigments as defined hereinafter.

By the term "zinc oxide pigment", as used herein, I mean a pigment containing zinc oxide which pigment does not contain, as an impurity, more than 8% by weight of lead compounds, calculated as lead sulfate.

By the term "zinc sulfide pigment", as used herein, I mean a pigment containing the chemical compound zinc sulfide, either alone or in conjunction with other modifying or extending ingredients.

By the term "lead pigment", as used herein, I mean pigment of the type represented by basic carbonate white lead and basic sulfate white lead, or mixtures of these, excluding cases in which the lead is present as an impurity in zinc oxide pigments in an amount greater than 8%, calculated as lead sulfate.

By the terms "extenders" or "fillers", as used herein, I mean materials which, if incorporated with a modified polyhydric alcohol-polybasic acid resin vehicle, in the amounts in which pigments are ordinarily incorporated to produce enamels or paints, without the addition of a pigment thereto, yield transparent or semi-transparent films.

By the term "substantially free from cellulose derivatives", as used herein, I mean that the material referred to does not contain substantial quantities of cellulose derivatives.

Coating compositions falling within the scope of the present invention may also include minor proportions of additional ingredients, other than cellulose derivatives, commonly used as film forming materials, including drying oils, natural resins, synthetic resins, and materials exerting a water repellant or water-proofing action, such as paraffin greases. Where the pigment combination contains a substantial quantity of a reactive pigment, however, it is necessary either to avoid the use of additional acidic ingredients or to restrict the quantity added so that the resulting acidity of the coating composition does not exceed that indicated above as the maximum acid number for the particular oil acids content polyhydric alcohol-polybasic acid resin used.

As many apparently widely different embodiments of this invention may be made without departing from the spirit and scope thereof, it is to be understood that I do not limit myself to the specific embodiments thereof except as defined in the appended patent claims.

I claim:

1. A coating composition substantially free from cellulose derivatives which comprises a pigment containing antimony and a vehicle comprising a resin which has, in combined form, the radicals of a polyhydric alcohol, a polybasic acid, and an oil having drying properties.

2. A coating composition substantially free from cellulose derivatives which comprises a pigment containing antimony and a vehicle comprising a resin which has, in combined form, the radicals of glycerol, phthalic anhydride, and an oil having drying properties.

3. The coating composition of claim 1, in which the pigment contains antimony and titanium.

4. The coating composition of claim 1, in which the antimony component, including any extender present in the coating composition, is at least 35% of the total pigment and extender.

5. The coating composition of claim 1, in which the antimony component, including any extender present in the coating composition, is at least 65% of the total pigment and extender.

6. The coating composition of claim 1, in which the pigment consists of an antimony pigment.

7. The coating composition of claim 1, in which the pigment consists of antimony and titanium.

8. The coating composition of claim 1, in which the pigment also contains a colored pigment.

9. The coating composition of claim 1, in which the pigment contains antimony, titanium and a colored pigment.

In testimony whereof, I affix my signature.

GORDON D. PATTERSON.